US012772106B2

(12) United States Patent
Khlass et al.

(10) Patent No.: US 12,772,106 B2
(45) Date of Patent: Oct. 20, 2026

(54) SUSPENDING RANDOM-ACCESS PROCEDURE

(71) Applicant: Nokia Technologies Oy, Espoo (FI)

(72) Inventors: Ahlem Khlass, Massy (FR); Srinivasan Selvaganapathy, Bangalore (IN); Halit Murat Gürsu, Munich (DE); Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 187 days.

(21) Appl. No.: 18/838,296

(22) PCT Filed: Jan. 19, 2023

(86) PCT No.: PCT/EP2023/051276
§ 371 (c)(1),
(2) Date: Aug. 14, 2024

(87) PCT Pub. No.: WO2023/156124
PCT Pub. Date: Aug. 24, 2023

(65) Prior Publication Data

US 2025/0150893 A1 May 8, 2025

Related U.S. Application Data

(60) Provisional application No. 63/311,709, filed on Feb. 18, 2022.

(51) Int. Cl.
*H04W 28/02* (2009.01)
*H04W 74/0833* (2024.01)
*H04W 74/0836* (2024.01)
*H04W 74/0838* (2024.01)

(52) U.S. Cl.
CPC ... *H04W 28/0289* (2013.01); *H04W 74/0833* (2013.01); *H04W 74/0836* (2024.01); *H04W 74/0838* (2024.01)

(58) Field of Classification Search
CPC ......... H04W 28/0289; H04W 74/0833; H04W 74/0836; H04W 74/0838
See application file for complete search history.

(56) References Cited

U.S. PATENT DOCUMENTS

2018/0206177 A1* 7/2018 Daoura .................. H04W 4/80
2018/0317264 A1* 11/2018 Agiwal ............... H04W 52/325
2020/0128582 A1* 4/2020 Chen ..................... H04W 72/51

* cited by examiner

*Primary Examiner* — Sun Jong Kim
(74) *Attorney, Agent, or Firm* — Barta Jones, PLLC

(57) ABSTRACT

Disclosed is a method comprising obtaining, by a terminal device in a radio access network, information comprising an event identifier, wherein the event identifier is to be used in reporting an event to the radio access network when the event occurs; selecting, by the terminal device, a value in response to the occurrence of the event; delaying, by the terminal device, by the selected value in time, one or more subsequent random access attempts associated with a random-access procedure to a cell of the radio access network; and suspending, by the terminal device, the random-access procedure during the delay.

20 Claims, 7 Drawing Sheets

SUSPENDING RANDOM-ACCESS PROCEDURE

FIELD

The following exemplary embodiments relate to wireless communication.

BACKGROUND

If multiple terminal devices attempt a random-access procedure on the same resources, a collision may occur. It is desirable to avoid such collisions.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus in a radio access network, the apparatus comprising at least one processor, and at least one memory including computer program code, wherein the at least one memory and the computer program code are configured, with the at least one processor, to cause the apparatus to: obtain information comprising an event identifier, wherein the event identifier is to be used in reporting an event to the radio access network when the event occurs; select a value in response to the occurrence of the event; delay by the selected value in time, one or more subsequent random access attempts associated with a random-access procedure to a cell of the radio access network; and suspend the random-access procedure during the delay.

According to another aspect, there is provided an apparatus in a radio access network, the apparatus comprising means for: obtaining information comprising an event identifier, wherein the event identifier is to be used in reporting an event to the radio access network when the event occurs; selecting a value in response to the occurrence of the event; delaying by the selected value in time, one or more subsequent random access attempts associated with a random-access procedure to a cell of the radio access network; and suspending the random-access procedure during the delay.

According to another aspect, there is provided a method comprising: obtaining, by a terminal device in a radio access network, information comprising an event identifier, wherein the event identifier is to be used in reporting an event to the radio access network when the event occurs; selecting, by the terminal device, a value in response to the occurrence of the event; delaying, by the terminal device, by the selected value in time, one or more subsequent random access attempts associated with a random-access procedure to a cell of the radio access network; and suspending, by the terminal device, the random-access procedure during the delay.

According to another aspect, there is provided a computer program product comprising program instructions which, when run on a computing apparatus in a radio access network, cause the computing apparatus to perform at least the following: obtaining information comprising an event identifier, wherein the event identifier is to be used in reporting an event to the radio access network when the event occurs; selecting a value in response to the occurrence of the event; delaying by the selected value in time, one or more subsequent random access attempts associated with a random-access procedure to a cell of the radio access network; and suspending the random-access procedure during the delay.

According to another aspect, there is provided a computer program comprising instructions for causing an apparatus in a radio access network to perform at least the following: obtaining information comprising an event identifier, wherein the event identifier is to be used in reporting an event to the radio access network when the event occurs; selecting a value in response to the occurrence of the event; delaying by the selected value in time, one or more subsequent random access attempts associated with a random-access procedure to a cell of the radio access network; and suspending the random-access procedure during the delay.

According to another aspect, there is provided a computer readable medium comprising program instructions for causing an apparatus in a radio access network to perform at least the following: obtaining information comprising an event identifier, wherein the event identifier is to be used in reporting an event to the radio access network when the event occurs; selecting a value in response to the occurrence of the event; delaying by the selected value in time, one or more subsequent random access attempts associated with a random-access procedure to a cell of the radio access network; and suspending the random-access procedure during the delay.

According to another aspect, there is provided a non-transitory computer readable medium comprising program instructions for causing an apparatus in a radio access network to perform at least the following: obtaining information comprising an event identifier, wherein the event identifier is to be used in reporting an event to the radio access network when the event occurs; selecting a value in response to the occurrence of the event; delaying by the selected value in time, one or more subsequent random access attempts associated with a random-access procedure to a cell of the radio access network; and suspending the random-access procedure during the delay.

According to another aspect, there is provided an apparatus in a radio access network, the apparatus comprising at least one processor, and at least one memory including computer program code, wherein the at least one memory and the computer program code are configured, with the at least one processor, to cause the apparatus to: obtain information indicating that an event occurs at one or more of a plurality of terminal devices in the radio access network; indicate a threshold value to the plurality of terminal devices, wherein the threshold value indicates a limit for delaying a random-access procedure to a cell of the radio access network at the plurality of terminal devices; receive, from a first terminal device of the plurality of terminal devices, a message comprising at least an event identifier corresponding to the event, the message being associated with the random-access procedure; and transmit, to one or more second terminal devices of the plurality of terminal devices, a command comprising at least the event identifier and an indication to stop one or more subsequent random access attempts associated with the random-access procedure.

According to another aspect, there is provided an apparatus in a radio access network, the apparatus comprising means for: obtaining information indicating that an event occurs at one or more of a plurality of terminal devices in the radio access network; indicating a threshold value to the plurality of terminal devices, wherein the threshold value indicates a limit for delaying a random-access procedure to a cell of the radio access network at the plurality of terminal devices; receiving, from a first terminal device of the plurality of terminal devices, a message comprising at least an event identifier corresponding to the event, the message being associated with the random-access procedure; and transmitting, to one or more second terminal devices of the plurality of terminal devices, a command comprising at least the event identifier and an indication to stop one or more subsequent random access attempts associated with the random-access procedure.

According to another aspect, there is provided a method comprising: obtaining, by a network element in a radio access network, information indicating that an event occurs at one or more of a plurality of terminal devices in the radio access network; indicating, by the network element, a threshold value to the plurality of terminal devices, wherein the threshold value indicates a limit for delaying a random-access procedure to a cell of the radio access network at the plurality of terminal devices; receiving, by the network element, from a first terminal device of the plurality of terminal devices, a message comprising at least an event identifier corresponding to the event, the message being associated with the random-access procedure; and transmitting, by the network element, to one or more second terminal devices of the plurality of terminal devices, a command comprising at least the event identifier and an indication to stop one or more subsequent random access attempts associated with the random-access procedure.

According to another aspect, there is provided a computer program comprising instructions for causing an apparatus in a radio access network to perform at least the following: obtaining information indicating that an event occurs at one or more of a plurality of terminal devices in the radio access network; indicating a threshold value to the plurality of terminal devices, wherein the threshold value indicates a limit for delaying a random-access procedure to a cell of the radio access network at the plurality of terminal devices; receiving, from a first terminal device of the plurality of terminal devices, a message comprising at least an event identifier corresponding to the event, the message being associated with the random-access procedure; and transmitting, to one or more second terminal devices of the plurality of terminal devices, a command comprising at least the event identifier and an indication to stop one or more subsequent random access attempts associated with the random-access procedure.

According to another aspect, there is provided a computer program product comprising program instructions which, when run on a computing apparatus in a radio access network, cause the computing apparatus to perform at least the following: obtaining information indicating that an event occurs at one or more of a plurality of terminal devices in the radio access network; indicating a threshold value to the plurality of terminal devices, wherein the threshold value indicates a limit for delaying a random-access procedure to a cell of the radio access network at the plurality of terminal devices; receiving, from a first terminal device of the plurality of terminal devices, a message comprising at least an event identifier corresponding to the event, the message being associated with the random-access procedure; and transmitting, to one or more second terminal devices of the plurality of terminal devices, a command comprising at least the event identifier and an indication to stop one or more subsequent random access attempts associated with the random-access procedure.

According to another aspect, there is provided a computer readable medium comprising program instructions for causing an apparatus in a radio access network to perform at least the following: obtaining information indicating that an event occurs at one or more of a plurality of terminal devices in the radio access network; indicating a threshold value to the plurality of terminal devices, wherein the threshold value indicates a limit for delaying a random-access procedure to a cell of the radio access network at the plurality of terminal devices; receiving, from a first terminal device of the plurality of terminal devices, a message comprising at least an event identifier corresponding to the event, the message being associated with the random-access procedure; and transmitting, to one or more second terminal devices of the plurality of terminal devices, a command comprising at least the event identifier and an indication to stop one or more subsequent random access attempts associated with the random-access procedure.

According to another aspect, there is provided a non-transitory computer readable medium comprising program instructions for causing an apparatus in a radio access network to perform at least the following: obtaining information indicating that an event occurs at one or more of a plurality of terminal devices in the radio access network; indicating a threshold value to the plurality of terminal devices, wherein the threshold value indicates a limit for delaying a random-access procedure to a cell of the radio access network at the plurality of terminal devices; receiving, from a first terminal device of the plurality of terminal devices, a message comprising at least an event identifier corresponding to the event, the message being associated with the random-access procedure; and transmitting, to one or more second terminal devices of the plurality of terminal devices, a command comprising at least the event identifier and an indication to stop one or more subsequent random access attempts associated with the random-access procedure.

According to another aspect, there is provided a system comprising at least a terminal device and a network element in a radio access network. The terminal device is configured to: obtain information comprising an event identifier, wherein the event identifier is to be used in reporting an event to the radio access network when the event occurs; select a value in response to the occurrence of the event; delay by the selected value in time, one or more subsequent random access attempts associated with a random-access procedure to a cell of the radio access network; suspend the random-access procedure during the delay; receive, from the network element, a command comprising at least the event identifier and an indication to stop the one or more subsequent random access attempts; and stop the one or more subsequent random access attempts based on the command. The network element is configured to: transmit, to the terminal device, the command comprising at least the event identifier and the indication to stop the one or more subsequent random access attempts.

According to another aspect, there is provided a system comprising at least a terminal device and a network element in a radio access network. The terminal device comprises means for: obtaining information comprising an event identifier, wherein the event identifier is to be used in reporting an event to the radio access network when the event occurs; selecting a value in response to the occurrence of the event; delaying by the selected value in time, one or more subsequent random access attempts associated with a random-access procedure to a cell of the radio access network; suspending the random-access procedure during the delay; receiving, from the network element, a command comprising at least the event identifier and an indication to stop the one or more subsequent random access attempts; and stopping the one or more subsequent random access attempts based on the command. The network element comprises means for: transmitting, to the terminal device, the command comprising at least the event identifier and the indication to stop the one or more subsequent random access attempts.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to “an”, “one”, or “some” embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G), or beyond 5G, without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
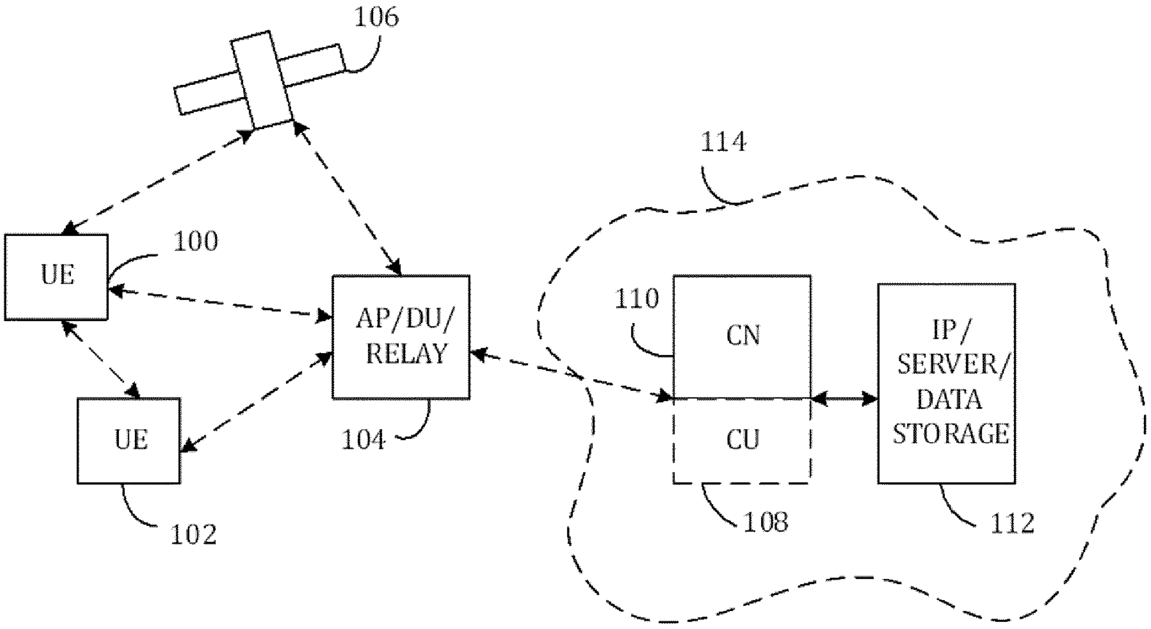
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to an eNodeB or a gNodeB, herein collectively referred to as (e/g)NodeB may be called uplink or reverse link, and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, user plane function (UPF), mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from a base station and forward it to a UE, and/or amplify a signal received from the UE and forward it to the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services such as an application server provided by them. The communication network may also be able to support the usage of cloud services, for example at least part of core network operations may be carried out as a cloud service (this is depicted in FIG. 1 by “cloud” 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs may be a Home(e/g)nodeB.

Furthermore, the (e/g)nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of “plug-and-play” (e/g)NodeBs may be introduced. A network which may be able to use “plug-and-play” (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator’s network, may aggregate traffic from a large number of HNBs back to a core network.

5G is designed to address a wide range of use cases, such as the enhanced mobile broadband (eMBB), ultra-reliable low latency communication (URLLC), and massive machine-type communication (mMTC), with different requirements in terms of data rates, latency, reliability, coverage, energy efficiency, and connection density. mMTC may cover cellular low power wide area (LPWA) technologies such as narrowband internet of things (NB-IoT) and long term evolution for machine type communication (LTE-MTC). Yet another use case for 5G is time-sensitive communication (TSC). However, in between these use cases, there are also some other mid-range use cases, such as industrial wireless sensor networks, video surveillance, and wearables (e.g., smart watches, rings, eHealth-related devices, personal protection equipment, medical monitoring devices, etc.). In other words, the requirements of these mid-range use cases may be higher than LPWA, but lower than eMBB and URLLC. In order to efficiently serve these mid-range use cases, the 3rd generation partnership project (3GPP) has introduced reduced capability (RedCap) devices in NR Release 17 (Rel-17). RedCap devices may also be referred to as RedCap UEs, NR-Lite devices, or NR-Light devices.

RedCap devices may have lower complexity (e.g., reduced bandwidth and number of antennas), a longer battery life, and a smaller form factor than non-RedCap devices, such as eMBB UEs, URLLC UEs and other legacy UEs. For example, a RedCap device may comprise 1 receiver branch and 1 transmitter branch (1Rx/1Tx), or 2 receiver branches and 1 transmitter branch (2Rx/1Tx), in both frequency range 1 (FR1) and frequency range 2 (FR2). RedCap devices may support all FR1 and FR2 bands for frequency-division duplexing (FDD) and time-division duplexing (TDD). In addition, FDD RedCap devices may be half-duplex (i.e., capable of either receiving or transmitting at a time) instead of full-duplex (i.e., capable of receiving and transmitting simultaneously).

Industrial wireless sensors and actuators are one example of RedCap devices. It may be desirable to connect these sensors and actuators to 5G radio access and core networks in order to improve flexibility, enhance productivity and efficiency, and improve operational safety. Industrial wireless sensors may comprise, for example, pressure sensors, humidity sensors, thermometers, motion sensors, and/or accelerometers, etc. Industrial wireless sensor network use cases include not only URLLC services with very high requirements, but also relatively low-end services requiring small device form factors and/or being completely wireless with a battery life of several years. These low-end services may be provided by RedCap devices. Industrial wireless sensors associated with low-end services may also have the following use-case-specific requirements: communication service availability is at least 99.99%, end-to-end latency is less than 100 ms, and the reference bit rate is less than 2 Mbps (potentially asymmetric, e.g., UL heavy traffic) for all use cases and the device is expected to be mostly stationary. For safety-related sensors, the latency requirement may be more stringent, for example 5-10 ms.

Video surveillance cameras are another example of RedCap devices. The deployment of surveillance cameras may be beneficial, for example, for smart city use cases, as well as for factories and industries, in order to monitor and control city/factory resources more efficiently. The following requirements may apply for video surveillance use cases: the reference economic video bitrate is 2-4 Mbps, latency is less than 500 ms, and the reliability is at least 99%-99.9%. High-end video applications (e.g., for farming) may require a video bitrate of 7.5-25 Mbps. It is noted that the traffic pattern may be dominated by UL transmissions.

Wearables, such as smart watches, rings, eHealth-related devices, personal protection equipment, and/or medical monitoring devices, are another example of RedCap devices. One characteristic for this use case is that the device is small in size. The following requirements may apply for wearables: the reference bitrate for smart wearable applications may be 10-50 Mbps in downlink (DL) and at least 5 Mbps in uplink (UL), and the peak bit rate of the device may be higher, for example up to 150 Mbps for DL and up to 50 Mbps for UL. In addition, the battery of the wearable device should last multiple days (e.g., up to 1-2 weeks).

New mechanisms may be needed to control RedCap devices' access to the network. For example, new information elements (IEs) in system information (SI) may be specified to indicate whether a RedCap device can camp on a specific cell and/or frequency. Furthermore, a new configuration may be provided to RedCap devices to explicitly identify them by the network at an early stage in Msg1 and/or Msg3, or MsgA, for the initial access procedure (i.e., random-access procedure).

A given UE may perform the random-access (RA) procedure to access the network. The purpose of performing the random-access procedure may be, for example, initial access, handover, scheduling request, or timing synchronization. There are currently two types of random-access procedures: a contention-based random-access procedure (CBRA) and a contention-free random-access procedure (CFRA). CFRA may also be referred to as non-contention based random access. In CFRA, a given UE has a dedicated (i.e., UE-specific) random-access preamble allocated by the base station, whereas in CBRA the UE selects the preamble randomly from a pool of preambles shared with other UEs in the cell. In CBRA, the contention (or collision) may occur, if two or more UEs attempt the random-access procedure on the same resources.

5G NR supports two different CBRA procedures: a 4-step random-access procedure (in Rel-15) and a 2-step random-access procedure (in Rel-16). The 4-step random-access procedure comprises the following four messages: a random-access preamble (Msg1) transmitted from the UE to the network, a random-access response (RAR, also called Msg2) transmitted from the network to the UE, an RRC setup request (Msg3) transmitted from the UE to the network, and an RRC setup message (Msg4) transmitted from the network to the UE. In the 2-step random-access procedure, Msg1 and Msg3 may be combined into a single message referred to as MsgA, and Msg2 and Msg4 may be combined into a single message referred to as MsgB.

There is a challenge in how to enable RedCap devices to co-exist and share resources with non-RedCap devices in order to enable the network to schedule resources properly for RedCap devices and non-RedCap devices during initial access, as well as to limit or avoid any negative impact on network performance. Herein the resources may refer to, for example, bandwidth part (BWP), random-access channel (RACH) resources, and/or RACH occasions (ROs). ROs refer to network-configured transmission occasions for random-access preamble transmission within a random-access procedure.

Both during and after initial access, even for the scenario where the initial UL BWP for non-RedCap devices is not configured to be wider than the RedCap device bandwidth, a separate initial UL BWP may optionally be configured or defined for RedCap devices. RO-sharing between RedCap and non-RedCap may also be possible.

For enabling/supporting that the RO associated with the best synchronization signal block (SSB) falls within the RedCap device bandwidth, a separate initial UL BWP for RedCap devices (which is not expected to exceed the maximum RedCap device bandwidth) may be supported. This separate initial UL BWP for RedCap may include ROs for RedCap devices. These ROs may be dedicated for RedCap devices or shared with non-RedCap UEs.

Based on the above, Msg1 early identification may be configured by defining separate (i.e., dedicated) RACH resources for RedCap devices, but this does not preclude enabling Msg3 identification which, on the contrary, implies that the RACH resources are shared between RedCap and non-RedCap devices.

In some industrial use cases, RedCap devices may be used to monitor application key performance indicators (KPIs), such as temperature, humidity, pressure, noise, etc., and to report the readouts (e.g., raw data and an alert, if a threshold is exceeded). The UL transmission generated from these devices may occur simultaneously and may cause congestion for example due to limited RACH resources, and the access may result in collision. This affects not only RedCap devices, which may re-attempt the random-access procedure until it succeeds, but also non-Redcap devices that are sharing the same RACH resources with the RedCap devices.

Currently, there may be no mechanism to prevent RedCap devices from initiating a random-access procedure once they are allowed to camp on a cell, and not even to delay the random-access attempt, which is not preferable for delay-sensitive type of data traffic. Additionally, the network may not be aware of the number of RedCap devices that are camping on a cell and potentially attempting to access the network simultaneously. Thus, in order to avoid the potential impact on non-RedCap devices sharing RACH resources with RedCap devices, the network may decide to prevent the access for all RedCap devices, or to let the RedCap devices access with a risk of collision from a massive number of random-access attempts.

In other words, in some of these use cases of data reporting, the network may receive the same message from different devices that report the same event or alarm. For example, an increase in a certain application KPI level, such as temperature, may be reported by multiple RedCap devices, which is not efficient from a power perspective for these RedCap devices, and also from a network resource utilization perspective. In this case, one or a few successful receptions of the application KPI reporting may be enough to declare an emergency at the network side and to take some actions.

Some exemplary embodiments may address the above issue, i.e., when the network observes a RACH overload, which is caused by a massive number of random-access attempts from different UEs reporting the same event or alarm, while one or a few reports would be sufficient to inform the network. This service-related information may be known at the application layer but not at the radio layer.

Some exemplary embodiments provide conditional event and/or alarm reporting from UEs such as RedCap devices based on network feedback and/or assistance.

Some exemplary embodiments may be used in UE-initiated event reporting, where the UE initiates data reporting, when a certain event occurs (e.g., an increase in temperature) using a common configured alarm identifier (ID). The alarm ID may also be referred to as an event identifier herein.

Alternatively, some exemplary embodiments may be used in network-triggered event reporting, where the network triggers data reporting from a group of UEs for example via paging (addressed using the alarm ID provided to these UEs).

In one exemplary embodiment, the configured alarm ID may be used for randomized initial transmission. The randomized initial transmission for event reporting may be controlled by the radio access network (RAN) node (e.g., gNB) by providing a randomization parameter to the UEs. The randomization parameter comprises a threshold value indicating a limit, i.e., a maximum time value, for delaying the random-access procedure of the UEs. The randomization parameter may be provided in system information in case of UE-initiated event reporting. Alternatively, the randomization parameter may be part of a paging message for network-triggered event reporting.

The UEs may select a random delay between 0 and the maximum time value indicated by the randomization parameter for delaying the random-access procedure. The number of collisions from simultaneous random-access attempts of different UEs may be relative to the maximum time value indicated by the randomization parameter. For example, if the maximum time value is smaller, the number of collisions from simultaneous random-access attempts may be higher. On the other hand, setting a larger value for the randomization parameter may provide a better spreading of the random-access attempts among the UEs, and thus reduce the number of collisions.

The access stratum (AS) layer of the UE may decide when to transmit the initial transmission (random-access preamble) based on the received randomization parameter provided by the gNB. Alternatively, the AS layer of the UE may apply default randomization for deciding when to transmit the initial transmission (random-access preamble).

In another exemplary embodiment, the configured alarm ID may be used for controlling random-access retransmission using network feedback. After initiating the random-access procedure, if no response is received in the random-access response (RAR) message, or if the random-access procedure fails, the UE may start monitoring the DL channel for network feedback before initiating retransmission of the random-access preamble. In the gNB, a specific radio network temporary identifier (RNTI) may be associated with the alarm ID and used to communicate with the UE.

For example, the network feedback that conditions the random-access retransmission may be sent via a network command in a physical downlink control channel (PDCCH) of the RAR search space or a pre-configured paging search space with a shorter time interval until the network receives the required number of alarm reports or until a timer expires.

The network command may comprise a mute, continue, or count-down value command along with the alarm ID. The mute, continue, or count-down value command may be set and provided by the gNB to instruct the UE on how to proceed: i.e., either to stop or to continue the random-access procedure (e.g., under some conditions) prior to attempting retransmission.

The count-down value may be sent by the gNB to a given UE. The count-down value may be decremented at every slot. When the count-down value reaches 0, the UE gains access to the channel and initiates a random-access retransmission. The count-down value may be used, if the network wants to receive the same alarm from a certain number of UEs (e.g., sensors) to confirm the event instead of relying on single report. Moreover, the network may decide to conclude on the situation based on contents of some sample of report, which may include specific details from each UE.

As another example, the provisioning of additional random-back-off or randomized muting for initial random-access procedures triggered for a specific alarm ID may be preconfigured. For example, the alarm ID and muting pattern may be preconfigured via the non-access stratum (NAS) layer or an application layer of the UE. The muting pattern indicates, or defines, a set of time occasions in connection with when to trigger or resume the random-access procedure and when to mute, i.e., stop, suspend, or postpone the random-access procedure.

Figure 2:
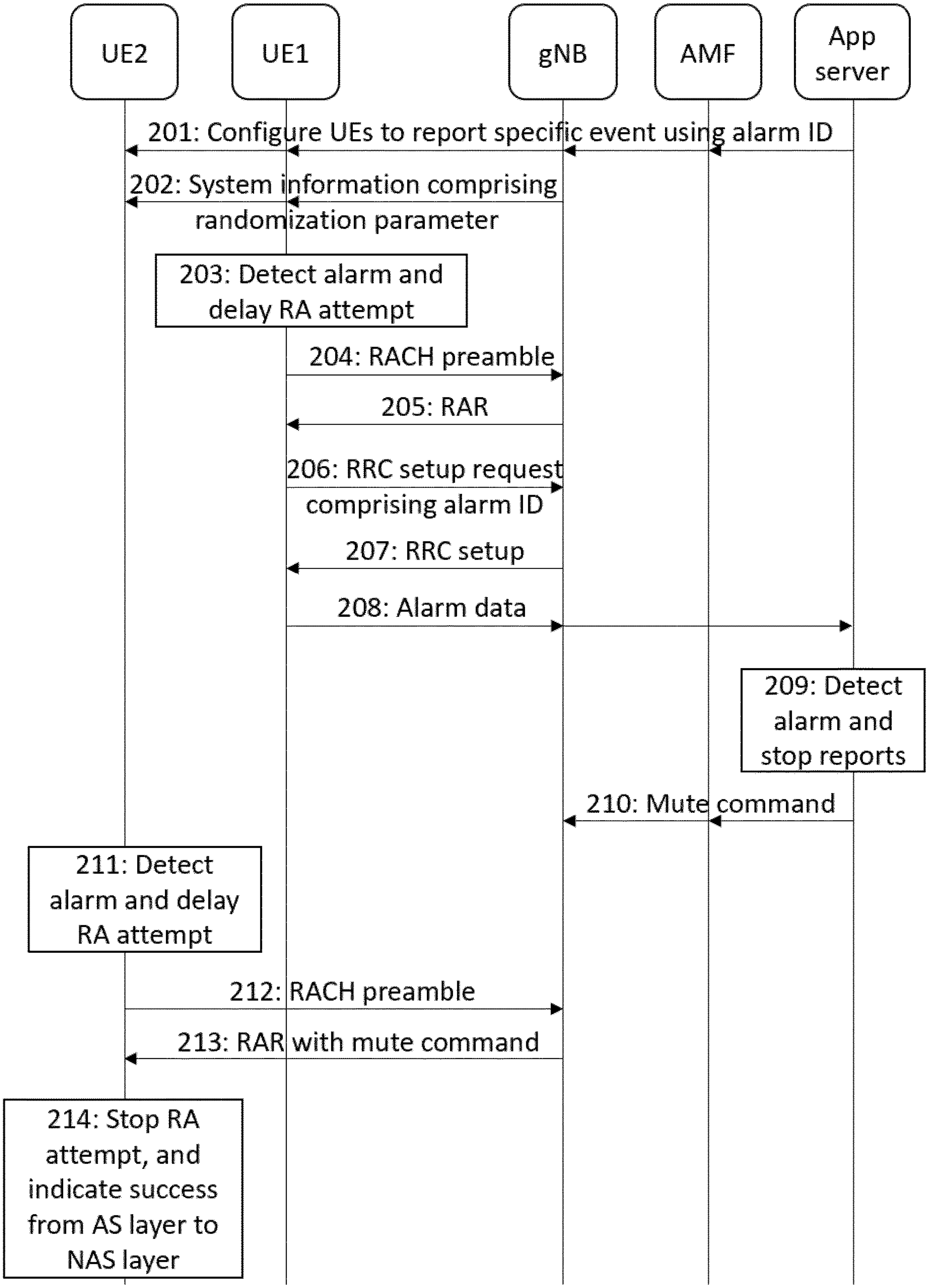
FIG. 2 illustrates a signaling diagram according to an exemplary embodiment.

FIG. 2 illustrates a signaling diagram according to an exemplary embodiment for a UE-initiated alarm reporting.

Referring to FIG. 2, in step 201, at least a first UE (UE1) and a second UE (UE2) are configured to report a specific event or alarm corresponding to an alarm ID defined by an application server. In other words, the first UE and the second UE are configured to report the same alarm or event associated with the alarm ID. For example, the alarm or event may indicate an increase above a threshold in at least one of: temperature, humidity, pressure, and/or noise. The alarm ID may comprise, for example, a unique numerical identifier for the alarm or event.

The application server may also define a required number of alarm reports received from different UEs addressed with this common alarm ID, and/or a timer indicating a time-out to be spent for alarm reception. The first UE and the second UE may store the alarm ID and use it to report a common alarm or event when it occurs. The first UE and the second UE may be RedCap devices, for example.

The application server may transmit the alarm configuration to a core network, which forwards the alarm configuration to the serving gNB of the first UE and the second UE. The core network may comprise at least an access and mobility management function (AMF). The core network may further comprise a user plane function (UPF) capable of communicating with the application server. The serving gNB may transmit the alarm configuration at least to the first UE and the second UE, and to any other concerned UEs. The serving gNB may transmit the alarm configuration using a broadcast message (e.g., via system information block) or via dedicated signaling.

In step 202, the serving gNB transmits system information to the first UE and the second UE, wherein the system information comprises a randomization parameter denoted as RAND herein. The randomization parameter comprises a threshold value indicating a limit, i.e., a maximum time value, for delaying the random-access procedure of the UEs.

The randomization parameter may be determined by the serving gNB based on the paging load of the RAN. The randomization parameter depends on the load condition and may be increased or decreased to allow more or less UEs to access the network simultaneously.

In step 203, the application layer of the first UE detects, or observes, an alarm or event associated with the alarm ID pre-defined in step 201, and sends the alarm ID to the access stratum layer of the first UE. The application layer may also flag the access stratum layer to start a randomized initial transmission. The alarm may be detected, while the first UE is camping on the cell provided by the serving gNB. The access stratum layer may decide on the initial transmission based on the randomization parameter received from the serving gNB. In other words, the first UE may delay one or more subsequent random access attempts associated with its random-access procedure by selecting a first random value (random_1) that is less than the threshold value indicated by the randomization parameter (i.e., random_1<RAND). The first UE suspends its random-access procedure during the delay. Thus, the first UE may avoid collision with other UEs.

Alternatively, if no randomization parameter is provided by the gNB, then the access stratum layer may apply default randomization for the decision of the initial transmission, or the first UE may initiate the random-access attempt immediately without delay.

In step 204, the first UE transmits a random-access preamble (Msg1) to the serving gNB after the delay applied in step 203.

In step 205, the serving gNB transmits a random-access response (RAR, also called Msg2) to the first UE in response to the random-access preamble received from the first UE.

In step 206, the first UE transmits an RRC setup request message (Msg3) to the serving gNB in response to the RAR, wherein the RRC setup request message comprises the alarm ID provided by the application layer of the first UE.

In step 207, the serving gNB transmits an RRC setup message (Msg4) to the first UE in response to the RRC setup request.

In step 208, the first UE transmits alarm data to the serving gNB, and the serving gNB forwards the alarm data to the application server. The alarm data may comprise information indicating that an event or alarm occurs at the first UE. For example, the alarm data may comprise raw data and the alarm or event associated with the alarm ID.

In step 209, the application server detects, based on the alarm data provided from the first UE, the alarm associated with the alarm ID pre-defined in step 201, and the application server determines to stop any further reports associated with that alarm ID.

In step 210, in response to receiving the alarm ID comprised in the RRC setup request message transmitted by the first UE, the application server requests the AMF to send a mute command along with the alarm ID, wherein the mute command indicates to stop any further reports associated with the alarm ID. The AMF forwards this common network response, i.e., the mute command, to the serving gNB.

In step 211, the application layer of the second UE detects, or observes, an alarm or event associated with the alarm ID pre-defined in step 201, and sends the alarm ID to the access stratum layer of the second UE. The application layer may also flag the access stratum layer to start a randomized initial transmission. The alarm may be detected, while the second UE is camping on the cell provided by the serving gNB. The access stratum layer may decide on the initial transmission based on the randomization parameter received from the serving gNB. In other words, the second UE may delay one or more subsequent random access attempts associated with its random-access procedure by selecting a second random value (random_2) that is less than the threshold value indicated by the randomization parameter (i.e., random_2<RAND). The second random value applied by the second UE may be different than the first random value applied by the first UE. The second UE suspends its random-access procedure during the delay. Thus, the second UE may avoid collision with other UEs (e.g., the first UE).

In step 212, the second UE transmits a random-access preamble to the serving gNB after the delay applied in step 211.

In step 213, the serving gNB transmits a random-access response to the second UE in response to the random-access preamble received from the second UE, wherein the random-access response comprises the mute command indicating to stop any further reports associated with the alarm ID, and thus to stop the random-access attempt of the second UE. The gNB may transmit the mute command as additional content in the ongoing RAR transmission. The network response on RAR may optionally use a discontinuous pattern, if required.

In step 214, the second UE stops, i.e., cancels, its random access attempt based on the received mute command, and the access stratum layer of the second UE indicates success of the random-access procedure to the non-access stratum layer of the second UE upon stopping the random access attempt. The success means that the network was already notified of the alarm or event from a different source. Since the alarm or event was already reported by the first UE successfully, there is no need for the second UE to report it.

Figure 3:
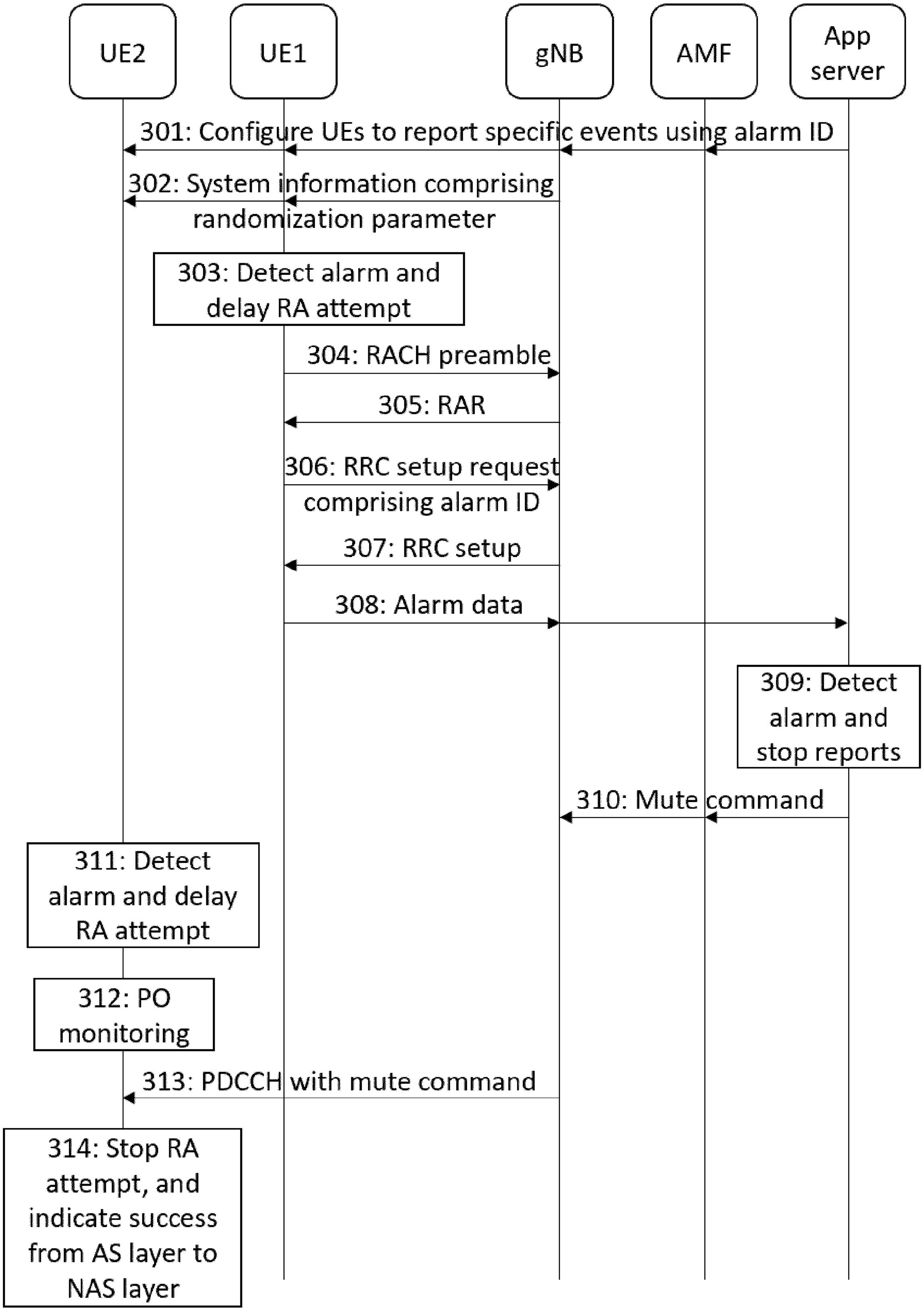
FIG. 3 illustrates a signaling diagram according to an exemplary embodiment.

FIG. 3 illustrates a signaling diagram according to another exemplary embodiment for a UE-initiated alarm reporting. In this exemplary embodiment, the gNB conveys the mute command via PDCCH instead of RAR.

Referring to FIG. 3, in step 301, at least a first UE (UE1) and a second UE (UE2) are configured to report a specific event or alarm corresponding to an alarm ID defined by an application server. In other words, the first UE and the second UE are configured to report the same alarm or event associated with the alarm ID. For example, the alarm or event may indicate an increase above a threshold in at least one of: temperature, humidity, pressure, and/or noise. The alarm ID may comprise, for example, a unique numerical identifier for the alarm.

The application server may also define a required number of alarm reports received from different UEs addressed with this common alarm ID, and/or a timer indicating a time-out to be spent for alarm reception. The first UE and the second UE may store the alarm ID and use it to report a common alarm or event when it occurs. The first UE and the second UE may be RedCap devices, for example.

The application server may transmit the alarm configuration to a core network, which forwards the alarm configuration to the serving gNB of the first UE and the second UE. The core network may comprise at least an AMF. The core network may further comprise a UPF capable of communicating with the application server. The serving gNB may transmit the alarm configuration at least to the first UE and the second UE, and to any other concerned UEs. The serving gNB may transmit the alarm configuration using a broadcast message (e.g., via system information block) or via dedicated signaling.

In step 302, the serving gNB transmits system information to the first UE and the second UE, wherein the system information comprises a randomization parameter denoted as RAND herein. The randomization parameter comprises a threshold value indicating a limit, i.e., a maximum time value, for delaying the random-access procedure of the UEs.

The randomization parameter may be determined by the serving gNB based on the paging load of the RAN. The randomization parameter depends on the load condition and may be increased or decreased to allow more or less UEs to access the network simultaneously.

In step 303, the application layer of the first UE detects, or observes, an alarm or event associated with the alarm ID pre-defined in step 301, and sends the alarm ID to the access stratum layer of the first UE. The application layer may also flag the access stratum layer to start a randomized initial transmission. The alarm may be detected, while the first UE is camping on the cell provided by the serving gNB. The access stratum layer may decide on the initial transmission based on the randomization parameter received from the serving gNB. In other words, the first UE may delay one or more subsequent random access attempts associated with its random-access procedure by selecting a first random value (random_1) that is less than the threshold value indicated by the randomization parameter (i.e., random_1<RAND). The first UE suspends its random-access procedure during the delay. Thus, the first UE may avoid collision with other UEs.

Alternatively, if no randomization parameter is provided by the gNB, then the access stratum layer may apply default randomization for the decision of the initial transmission, or the first UE may initiate the random-access attempt immediately without delay.

In step 304, the first UE transmits a random-access preamble (Msg1) to the serving gNB after the delay applied in step 303.

In step 305, the serving gNB transmits a random-access response (RAR, also called Msg2) to the first UE in response to the random-access preamble received from the first UE.

In step 306, the first UE transmits an RRC setup request message (Msg3) to the serving gNB in response to the RAR, wherein the RRC setup request message comprises the alarm ID provided by the application layer of the first UE.

In step 307, the serving gNB transmits an RRC setup message (Msg4) to the first UE in response to the RRC setup request.

In step 308, the first UE transmits alarm data to the serving gNB, and the serving gNB forwards the alarm data to the application server. The alarm data may comprise information indicating that an event or alarm occurs at the first UE. For example, the alarm data may comprise raw data and the alarm or event associated with the alarm ID.

In step 309, the application server detects, based on the alarm data provided from the first UE, the alarm associated with the alarm ID pre-defined in step 301, and the application server determines to stop any further reports associated with that alarm ID.

In step 310, in response to receiving the alarm ID comprised in the RRC setup request message transmitted by the first UE, the application server requests the AMF to send a mute command along with the alarm ID, wherein the mute command indicates to stop any further reports associated with the alarm ID. The AMF forwards this common network response, i.e., the mute command, to the serving gNB.

In step 311, the application layer of the second UE detects, or observes, an alarm or event associated with the alarm ID pre-defined in step 301, and sends the alarm ID to the access stratum layer of the second UE. The application layer may also flag the access stratum layer to start a randomized initial transmission. The alarm may be detected, while the second UE is camping on the cell provided by the serving gNB. The access stratum layer may decide on the initial transmission based on the randomization parameter received from the serving gNB. In other words, the second UE may delay its random access attempt by selecting a second random value (random_2) that is less than the threshold value indicated by the randomization parameter (i.e., random_2<RAND). The second random value applied by the second UE may be different than the first random value applied by the first UE. The second UE suspends its random-access procedure during the delay. Thus, the second UE may avoid collision with other UEs (e.g., the first UE).

In step 312, the second UE monitors one or more paging occasions (POs) in PDCCH on a pre-configured paging search space with a shorter time interval.

In step 313, the serving gNB transmits the mute command in a paging message in PDCCH to the second UE. The second UE receives the mute command in the paging message, while the second UE is monitoring for the one or more paging occasions.

In step 314, the second UE stops, i.e., cancels, its random-access attempt based on the received mute command, and the access stratum layer of the second UE indicates success of the random-access procedure to the non-access stratum layer of the second UE upon stopping the random-access attempt. The success means that the network was already notified of the alarm or event from a different source. Since the alarm or event was already reported by the first UE successfully, there is no need for the second UE to report it.

Figure 4:
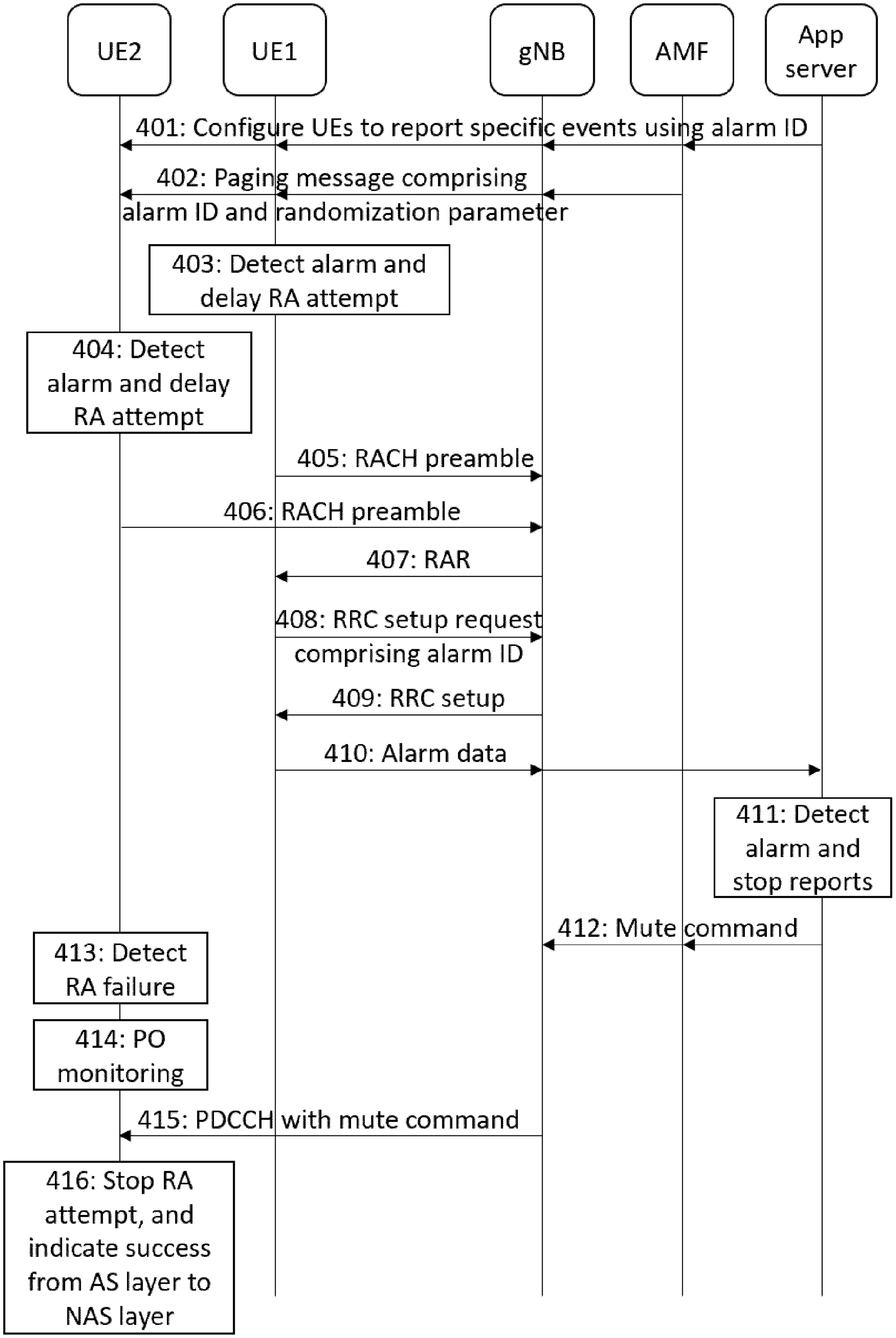
FIG. 4 illustrates a signaling diagram according to an exemplary embodiment.

FIG. 4 illustrates a signaling diagram according to another exemplary embodiment for network-initiated alarm reporting. In this exemplary embodiment, the network triggers the alarm reporting via paging. If the UE receives no response in RAR or if the random-access procedure fails, the UE may start monitoring PDCCH of the RAR search space or a pre-configured paging search space with a shorter interval in order to receive the alarm ID and the mute, continue, or count-down command prior to attempting retransmission of the random-access preamble.

Referring to FIG. 4, in step 401, at least a first UE (UE1) and a second UE (UE2) are configured to report a specific event or alarm corresponding to an alarm ID defined by an application server. In other words, the first UE and the second UE are configured to report the same alarm or event associated with the alarm ID. For example, the alarm or event may indicate an increase above a threshold in at least one of: temperature, humidity, pressure, and/or noise. The alarm ID may comprise, for example, a unique numerical identifier for the alarm.

The application server may also define a required number of alarm reports received from different UEs addressed with this common alarm ID, and/or a timer indicating a time-out to be spent for alarm reception. The first UE and the second UE may store the alarm ID and use it to report a common alarm or event when it occurs. The first UE and the second UE may be RedCap devices, for example.

The application server may transmit the alarm configuration to a core network, which forwards the alarm configuration to the serving gNB of the first UE and the second UE. The core network may comprise at least an AMF. The core network may further comprise a UPF capable of communicating with the application server. The serving gNB may transmit the alarm configuration at least to the first UE and the second UE, and to any other concerned UEs. The serving gNB may transmit the alarm configuration using a broadcast message (e.g., via system information block) or via dedicated signaling.

In step 402, the AMF transmits a paging message to the serving gNB, which forwards the paging message to the first UE and the second UE. The paging message comprises the alarm ID and a randomization parameter denoted as RAND herein. The randomization parameter comprises a threshold value indicating a limit, i.e., a maximum time value, for delaying the random-access procedure of the UEs.

The randomization parameter may be determined by the AMF based on the paging load of the core network. The randomization parameter depends on the load condition and may be increased or decreased to allow more or less UEs to access the network simultaneously. In step 403, the application layer of the first UE detects, or observes, an alarm or event associated with the alarm ID pre-defined in step 401, and sends the alarm ID to the access stratum layer of the first UE. The application layer may also flag the access stratum layer to start a randomized initial transmission. The alarm may be detected, while the first UE is camping on the cell provided by the serving gNB. The access stratum layer may decide on the initial transmission based on the randomization parameter received from the serving gNB. In other words, the first UE may delay its random access attempt by selecting a first random value (random_1) that is less than the threshold value indicated by the randomization parameter (i.e., random_1<RAND). The first UE suspends its random-access procedure during the delay. Thus, the first UE may avoid collision with other UEs.

In step 404, the application layer of the second UE detects, or observes, an alarm or event associated with the alarm ID pre-defined in step 401, and sends the alarm ID to the access stratum layer of the second UE. The application layer may also flag the access stratum layer to start a randomized initial transmission. The alarm may be detected, while the second UE is camping on the cell provided by the serving gNB. The access stratum layer may decide on the initial transmission based on the randomization parameter received from the serving gNB. In other words, the second UE may delay its random access attempt by selecting a second random value (random_2) that is less than the threshold value indicated by the randomization parameter (i.e., random_2<RAND). The second UE suspends its random-access procedure during the delay. Thus, the second UE may avoid collision with other UEs.

In step 405, the first UE transmits a random-access preamble (Msg1) to the serving gNB after the delay applied in step 403.

In step 406, the second UE transmits a random-access preamble to the serving gNB after the delay applied in step 404. Due to the randomized delay, the second UE transmits the random-access preamble after the first UE transmits its random-access preamble.

In step 407, the serving gNB transmits a random-access response (RAR, also called Msg2) to the first UE in response to the random-access preamble received from the first UE.

In step 408, the first UE transmits an RRC setup request message (Msg3) to the serving gNB in response to the RAR, wherein the RRC setup request message comprises the alarm ID provided by the application layer of the first UE.

In step 409, the serving gNB transmits an RRC setup message (Msg4) to the first UE in response to the RRC setup request.

In step 410, the first UE may transmit alarm data to the serving gNB, and the serving gNB may forward the alarm data to the application server. The alarm data may comprise information indicating that an event or alarm occurs at the first UE. For example, the alarm data may comprise raw data and the alarm or event associated with the alarm ID.

In step 411, the application server detects, based on the alarm data provided from the first UE, the alarm associated with the alarm ID pre-defined in step 401, and the application server determines to stop any further reports associated with that alarm ID.

In step 412, in response to receiving the alarm ID comprised in the RRC setup request message transmitted by the first UE, the application server requests the AMF to send a mute command along with the alarm ID, wherein the mute command indicates to stop any further reports associated with the alarm ID. The AMF forwards this common network response, i.e., the mute command, to the serving gNB.

In step 413, the second UE detects failure of the random-access attempt started by the second UE after the first UE. In other words, the serving gNB did not receive the random-access preamble transmitted by the second UE in step 406. For example, the failure may be caused by preamble collision with a third UE or non-reception at the gNB due to poor radio conditions.

In step 414, the second UE monitors one or more paging occasions (POs) in PDCCH on a pre-configured paging search space with a shorter time interval before initiating retransmission of the random-access preamble.

In step 415, the serving gNB transmits the mute command in a paging message in PDCCH to the second UE. The second UE receives the mute command in the paging message, while the second UE is monitoring for the one or more paging occasions. The mute command instructs the UE to stop, i.e., cancel, the random-access attempt.

In step 416, the second UE stops, i.e., cancels, its random access attempt based on the received mute command, and the access stratum layer of the second UE indicates success of the random-access procedure to the non-access stratum layer of the second UE upon stopping the random-access attempt. The success means that the network was already notified of the alarm or event from a different source. Since the alarm or event was already reported by the first UE successfully, there is no need for the second UE to reattempt the random-access procedure for reporting the alarm or event.

Alternatively, if the second UE does not receive any mute command, the second UE may stop the random-access retransmission attempts after a certain number of attempts has been reached or after a configured timer expires. The second UE may report this to higher layer, so that it can clear the alarm message and stop further random-access attempts.

Figure 5:
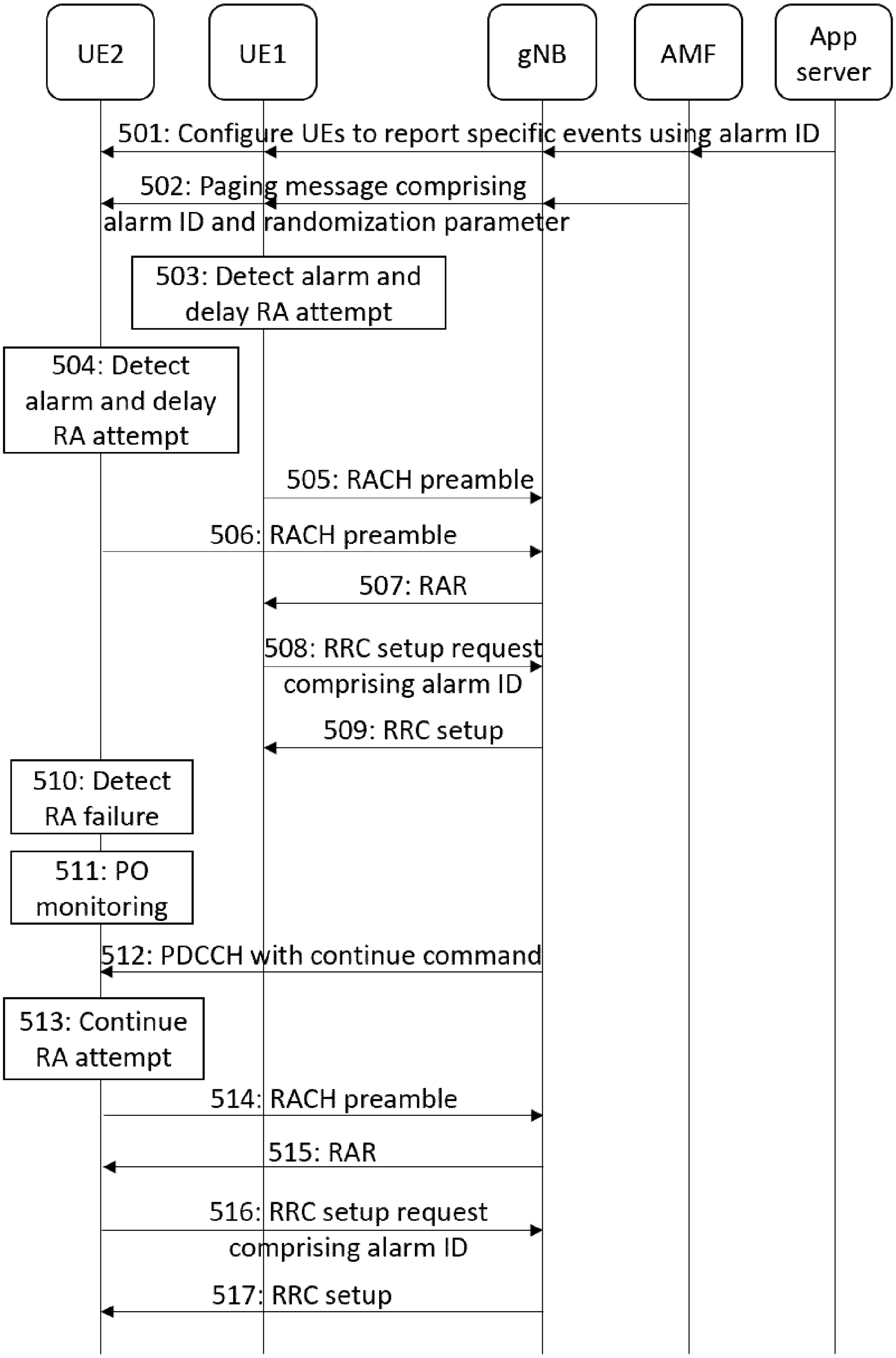
FIG. 5 illustrates a signaling diagram according to an exemplary embodiment.

FIG. 5 illustrates a signaling diagram according to another exemplary embodiment for network-initiated alarm reporting. In this exemplary embodiment, the network triggers the alarm reporting via paging. If the UE receives no response in RAR or if the random-access attempt fails, the UE may start monitoring PDCCH of the RAR search space or a pre-configured paging search space with a shorter interval in order to receive the alarm ID and the mute, continue, or count-down command prior to attempting retransmission of the random-access preamble.

Referring to FIG. 5, in step 501, at least a first UE (UE1) and a second UE (UE2) are configured to report a specific event or alarm corresponding to an alarm ID defined by an application server. In other words, the first UE and the second UE are configured to report the same alarm or event associated with the alarm ID. For example, the alarm or event may indicate an increase above a threshold in at least one of: temperature, humidity, pressure, and/or noise. The alarm ID may comprise, for example, a unique numerical identifier for the alarm.

The application server may also define a required number of alarm reports received from different UEs addressed with this common alarm ID, and/or a timer indicating a time-out to be spent for alarm reception. The first UE and the second UE may store the alarm ID and use it to report a common alarm or event when it occurs. The first UE and the second UE may be RedCap devices, for example.

The application server may transmit the alarm configuration to a core network, which forwards the alarm configuration to the serving gNB of the first UE and the second UE. The core network may comprise at least an AMF. The core network may further comprise a UPF capable of communicating with the application server. The serving gNB may transmit the alarm configuration at least to the first UE and the second UE, and to any other concerned UEs. The serving gNB may transmit the alarm configuration using a broadcast message (e.g., via system information block) or via dedicated signaling.

In step 502, the AMF transmits a paging message to the serving gNB, which forwards the paging message to the first UE and the second UE. The paging message comprises the alarm ID and a randomization parameter denoted as RAND herein. The randomization parameter comprises a threshold value indicating a limit, i.e., a maximum time value, for delaying the random-access procedure of the UEs.

The randomization parameter may be determined by the AMF based on the paging load of the core network. The randomization parameter depends on the load condition and may be increased or decreased to allow more or less UEs to access the network simultaneously.

In step 503, the application layer of the first UE detects, or observes, an alarm or event associated with the alarm ID pre-defined in step 501, and sends the alarm ID to the access stratum layer of the first UE. The application layer may also flag the access stratum layer to start a randomized initial transmission. The alarm may be detected, while the first UE is camping on the cell provided by the serving gNB. The access stratum layer may decide on the initial transmission based on the randomization parameter received from the serving gNB. In other words, the first UE may delay its random access attempt by selecting a first random value (random_1) that is less than the threshold value indicated by the randomization parameter (i.e., random_1<RAND). The first UE suspends its random-access procedure during the delay. Thus, the first UE may avoid collision with other UEs.

In step 504, the application layer of the second UE detects, or observes, an alarm or event associated with the alarm ID pre-defined in step 501, and sends the alarm ID to the access stratum layer of the second UE. The application layer may also flag the access stratum layer to start a randomized initial transmission. The alarm may be detected, while the second UE is camping on the cell provided by the serving gNB. The access stratum layer may decide on the initial transmission based on the randomization parameter received from the serving gNB. In other words, the second UE may delay its random access attempt by selecting a second random value (random_2) that is less than the threshold value indicated by the randomization parameter (i.e., random_2<RAND). The second UE suspends its random-access procedure during the delay. Thus, the second UE may avoid collision with other UEs.

In step 505, the first UE transmits a random-access preamble (Msg1) to the serving gNB after the delay applied in step 503.

In step 506, the second UE transmits a random-access preamble to the serving gNB after the delay applied in step 504. Due to the randomized delay, the second UE transmits the random-access preamble after the first UE transmits its random-access preamble.

In step 507, the serving gNB transmits a random-access response (RAR, also called Msg2) to the first UE in response to the random-access preamble received from the first UE.

In step 508, the first UE transmits an RRC setup request message (Msg3) to the serving gNB in response to receiving the RAR, wherein the RRC setup request message comprises the alarm ID provided by the application layer of the first UE.

In step 509, the serving gNB transmits an RRC setup message (Msg4) to the first UE in response to the RRC setup request received from the first UE.

In step 510, the second UE detects failure of the random-access attempt started by the second UE after the first UE. In other words, the serving gNB did not receive the random-access preamble transmitted by the second UE in step 506. For example, the failure may be caused by preamble collision with a third UE or non-reception at the gNB due to poor radio conditions.

In step 511, the second UE monitors one or more paging occasions (POs) in PDCCH on a pre-configured paging search space with a shorter time interval before initiating retransmission of the random-access preamble.

In step 512, the serving gNB transmits a continue command in a paging message in PDCCH to the second UE. For example, the serving gNB may not yet have received the pre-defined number of reports required by the application server, and thus the serving gNB wants to receive the alarm report from the second UE as well. The second UE receives the continue command in the paging message, while the second UE is monitoring for the one or more paging occasions. The continue command instructs the UE to continue the random-access attempt by performing random-access retransmission, i.e., retransmission of the random-access preamble.

In step 513, the second UE continues the random access attempt based on the received continue command.

In step 514, the second UE retransmits the random-access preamble to the serving gNB upon continuing the random access attempt. The serving gNB successfully receives the random-access preamble retransmitted by the second UE.

In step 515, the serving gNB transmits a random-access response to the second UE in response to the random-access preamble received from the second UE.

In step 516, the second UE transmits an RRC setup request message to the serving gNB in response to receiving the RAR, wherein the RRC setup request message comprises the alarm ID provided by the application layer of the second UE.

In step 517, the serving gNB transmits an RRC setup message to the first UE in response to the RRC setup request transmitted from the second UE.

In FIGS. 2-5, a 4-step random-access procedure is illustrated as an example. However, it should be noted that some exemplary embodiments may also be used with a 2-step random-access procedure. In the 2-step random-access procedure, the random-access preamble (Msg1) and the RRC setup request (Msg3) may be combined into a single message referred to as MsgA, and the random-access response (Msg2) and the RRC setup message (Msg4) may be combined into a single message referred to as message B (MsgB). For example, the mute/count-down/continue command may be comprised in MsgB instead of a random-access response, in case a 2-step random-access procedure is applied. In case the network cannot decode Msg-A due to collision, it may send Msg2 comprising the mute command. In addition to the mute command, MsgB may also comprise the contention-resolution identifier. This can stop the UE that was unsuccessful in contention resolution from attempting to send the same message (i.e., message with the same alarm ID) again. The unsuccessful UE, however, may continue to attempt random access if the message is different.

Figure 6:
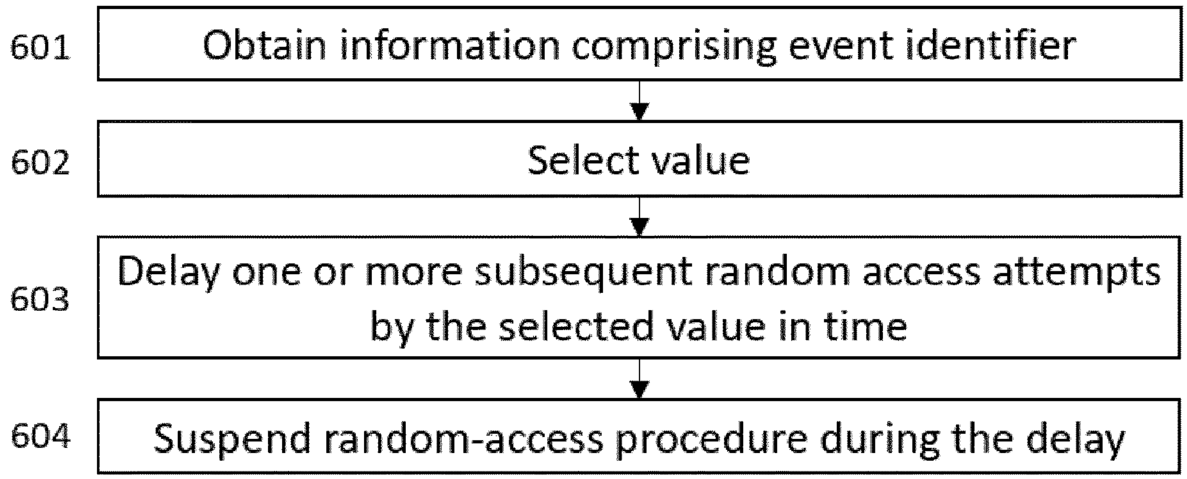
FIG. 6 illustrates a flow chart according to an exemplary embodiment.

FIG. 6 illustrates a flow chart according to an exemplary embodiment. The steps illustrated in FIG. 6 may be performed by an apparatus such as, or comprised in, a terminal device in a radio access network. The terminal device may also be referred to as a user device, user equipment, UE, first UE, second UE, first terminal device, or second terminal device herein. The terminal device may be, for example, a reduced capability (RedCap) device or any other type of UE.

Referring to FIG. 6, in step 601, information comprising an event identifier is obtained, wherein the event identifier is to be used in reporting an event to the radio access network when the event occurs. The event identifier may also be referred to as an alarm ID herein.

In step 602, a value is selected in response to the occurrence of the event;

In step 603, one or more subsequent random access attempts associated with a random-access procedure to a cell of the radio access network are delayed by the selected value in time.

In step 604, the random-access procedure is suspended during the delay.

Figure 7:
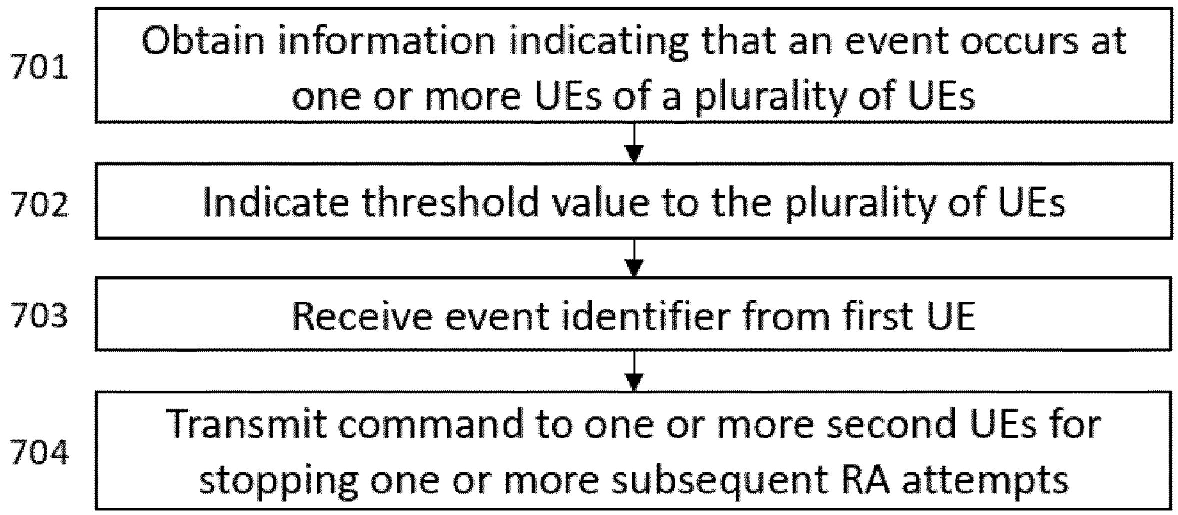
FIG. 7 illustrates a flow chart according to an exemplary embodiment.

FIG. 7 illustrates a flow chart according to an exemplary embodiment. The steps illustrated in FIG. 7 may be performed by an apparatus such as, or comprised in, a network element in a radio access network.

Referring to FIG. 7, in step 701, information is obtained, the information indicating that an event occurs at one or more of a plurality of terminal devices in the radio access network.

In step 702, a threshold value is indicated to the plurality of terminal devices, wherein the threshold value indicates a limit for delaying a random-access procedure to a cell of the radio access network at the plurality of terminal devices.

In step 703, a message is received from a first terminal device of the plurality of terminal devices, the message comprising at least an event identifier corresponding to the event, the message being associated with the random-access procedure. The event identifier may also be referred to as an alarm ID herein.

In step 704, a command is transmitted to one or more second terminal devices of the plurality of terminal devices, the command comprising at least the event identifier and an indication to stop one or more subsequent random access attempts associated with the random-access procedure.

The steps and/or blocks described above by means of FIGS. 2-7 are in no absolute chronological order, and some of them may be performed simultaneously or in an order differing from the described one. Other steps and/or blocks may also be executed between them or within them.

A technical advantage provided by some exemplary embodiments is that they may prevent collisions due to a massive number of random-access (re)attempts (i.e., when a large number of UEs attempt the random-access procedure on the same resources). Furthermore, some exemplary embodiments may enable controlling the random-access resource allocation of RedCap devices. Moreover, some exemplary embodiments may enable better resource management and co-existence between RedCap devices and non-Redcap devices (i.e., when random-access resources are shared between RedCap devices and non-RedCap devices). Some exemplary embodiments may also reduce UE power consumption by avoiding continuous random-access reattempts, since retransmission can be omitted when the event or alarm is already detected at the network node.

Figure 8:
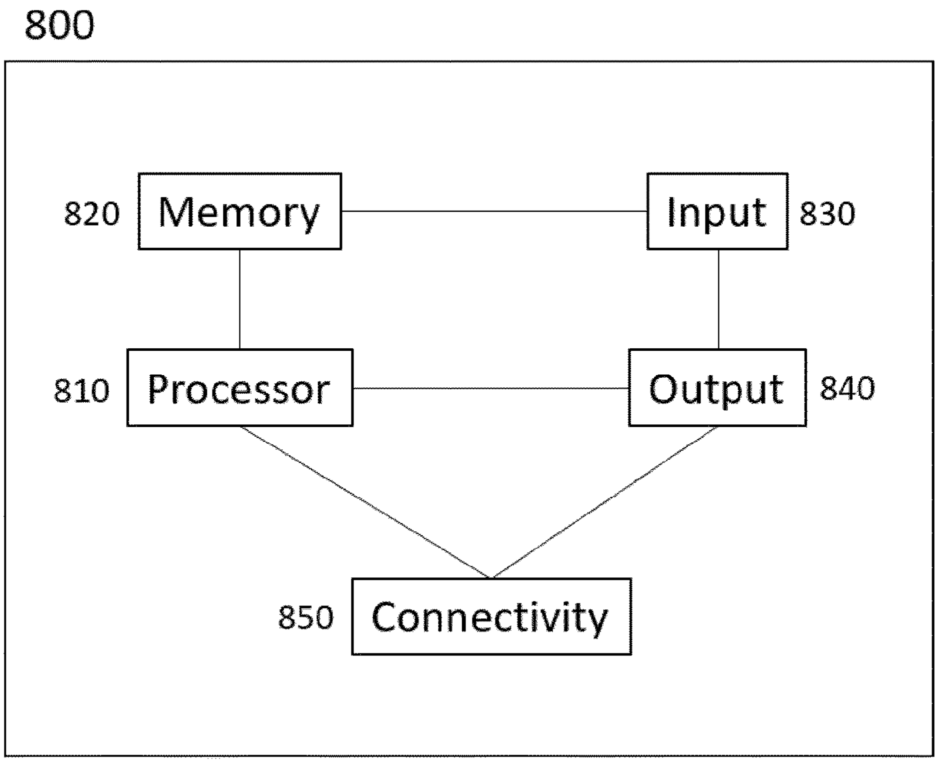
FIG. 8 illustrates an apparatus according to an exemplary embodiment.

FIG. 8 illustrates an apparatus 800, which may be an apparatus such as, or comprised in, a terminal device, according to an exemplary embodiment. The terminal device may also be referred to as a UE, first UE, second UE, first terminal device, second terminal device, user equipment, or reduced capability (RedCap) device herein. The apparatus 800 comprises a processor 810. The processor 810 interprets computer program instructions and processes data. The processor 810 may comprise one or more programmable processors. The processor 810 may comprise programmable hardware with embedded firmware and may, alternatively or additionally, comprise one or more application-specific integrated circuits (ASICs).

The processor 810 is coupled to a memory 820. The processor is configured to read and write data to and from the memory 820. The memory 820 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 820 stores computer readable instructions that are executed by the processor 810. For example, non-volatile memory stores the computer readable instructions and the processor 810 executes the instructions using volatile memory for temporary storage of data and/or instructions.

The computer readable instructions may have been prestored to the memory 820 or, alternatively or additionally, they may be received, by the apparatus, via an electromagnetic carrier signal and/or may be copied from a physical entity such as a computer program product. Execution of the computer readable instructions causes the apparatus 800 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 800 may further comprise, or be connected to, an input unit 830. The input unit 830 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 830 may comprise an interface to which external devices may connect to.

The apparatus 800 may also comprise an output unit 840. The output unit may comprise or be connected to one or more displays capable of rendering visual content, such as a light emitting diode (LED) display, a liquid crystal display (LCD) and/or a liquid crystal on silicon (LCoS) display. The output unit 840 may further comprise one or more audio outputs. The one or more audio outputs may be for example loudspeakers.

The apparatus 800 further comprises a connectivity unit 850. The connectivity unit 850 enables wireless connectivity to one or more external devices. The connectivity unit 850 comprises at least one transmitter and at least one receiver that may be integrated to the apparatus 800 or that the apparatus 800 may be connected to. The at least one transmitter comprises at least one transmission antenna, and the at least one receiver comprises at least one receiving antenna. The connectivity unit 850 may comprise an integrated circuit or a set of integrated circuits that provide the wireless communication capability for the apparatus 800. Alternatively, the wireless connectivity may be a hardwired application-specific integrated circuit (ASIC). The connectivity unit 850 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 800 may further comprise various components not illustrated in FIG. 8. The various components may be hardware components and/or software components.

Figure 9:
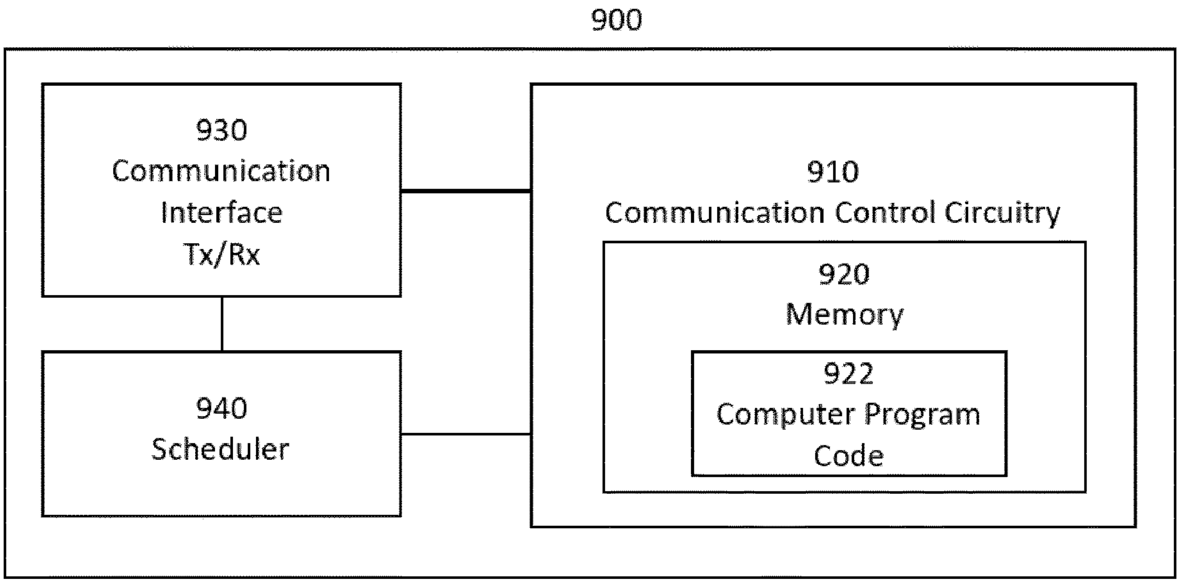
FIG. 9 illustrates an apparatus according to an exemplary embodiment.

The apparatus 900 of FIG. 9 illustrates an exemplary embodiment of an apparatus such as, or comprised in, a network element in a radio access network. The network element may also be referred to, for example, as a network node, a RAN node, a NodeB, an LTE evolved NodeB (eNB), a gNB, a base station, an NR base station, a 5G base station, an access node, an access point (AP), a relay node, a repeater, an integrated access and backhaul (IAB) node, an IAB donor node, a distributed unit (DU), a central unit (CU), an access and mobility management function (AMF), an application server, a baseband unit (BBU), a radio unit (RU), a radio head, a remote radio head (RRH), or a transmission and reception point (TRP).

The apparatus 900 may comprise, for example, a circuitry or a chipset applicable for realizing some of the described exemplary embodiments. The apparatus 900 may be an electronic device comprising one or more electronic circuitries. The apparatus 900 may comprise a communication control circuitry 910 such as at least one processor, and at least one memory 920 storing instructions that, when executed by the at least one processor, cause the apparatus 900 to carry out some of the exemplary embodiments described above. Such instructions may, for example, include a computer program code (software) 922 wherein the at least one memory and the computer program code (software) 922 are configured, with the at least one processor, to cause the apparatus 900 to carry out some of the exemplary embodiments described above. Herein computer program code may in turn refer to instructions that cause the apparatus 900 to perform some of the exemplary embodiments described above. That is, the at least one processor and the at least one memory 920 storing the instructions may cause said performance of the apparatus.

The processor is coupled to the memory 920. The processor is configured to read and write data to and from the memory 920. The memory 920 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 920 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 900 may further comprise a communication interface 930 comprising hardware and/or software for realizing communication connectivity according to one or more communication protocols. The communication interface 930 comprises at least one transmitter (Tx) and at least one receiver (Rx) that may be integrated to the apparatus 900 or that the apparatus 900 may be connected to. The communication interface 930 provides the apparatus with radio communication capabilities to communicate in the cellular communication system. The communication interface may, for example, provide a radio interface to terminal devices. The apparatus 900 may further comprise another interface towards a core network such as the network coordinator apparatus and/or to the access nodes of the cellular communication system. The apparatus 900 may further comprise a scheduler 940 that is configured to allocate resources. The scheduler 940 may be configured along with the communication control circuitry 910 or it may be separately configured.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus in a radio access network, the apparatus comprising: at least one processor; and at least one memory including one or more computer program codes, wherein the computer program codes are configured that, when are executed with the at least one processor, to cause the apparatus to:

obtain information comprising an event identifier, wherein the event identifier is to be used in reporting an event to the radio access network when the event occurs, wherein the event indicates an increase above a respective threshold in the following: temperature, humidity, pressure, and noise of the apparatus;

receive system information comprising a randomization parameter that is based on a load condition of the radio access network, the randomization parameter comprises a threshold value indicating a maximum time value for delaying a random-access procedure;

detect, by an application layer of the apparatus, the event associated with the event identifier; send the event identifier to an access stratum layer of the apparatus;

based on sending the event identifier, causing the access stratum layer to initiate a randomized initial transmission based on the randomization parameter;

select a delay value in response to an occurrence of the event, wherein the delay value is less than the threshold value;

delay by the selected delay value in time, one or more subsequent random access attempts associated with the random-access procedure to a cell of the radio access network;

suspend the random-access procedure during the delay;

receive, from the cell, a command comprising at least the event identifier and an indication to continue the one or more subsequent random access attempts, wherein the command is received based on a predefined number of reports associated with the event identifier required by an application server are not yet received; and stop the one or more subsequent random access attempts associated with the event identifier based on a pre-defined pattern, wherein the pre-defined pattern indicates a set of time occasions in connection with: when to trigger or resume the random-access procedure associated with the event identifier; and when to suspend or postpone the random-access procedure associated with the event identifier.

2. The apparatus of claim 1, wherein the selected delay value is a random value.

3. The apparatus of claim 2, wherein the apparatus is further caused to:

monitor one or more paging occasions on a search space with a time interval, wherein the command is received in a paging message, while monitoring the one or more paging occasions.

4. The apparatus of claim 3, wherein the apparatus is further caused to:

indicate, from the access stratum layer of the apparatus, to a non-access stratum layer of the apparatus, a success of the random-access procedure upon stopping the one or more subsequent random access attempts.

5. The apparatus of claim 4, wherein the apparatus is further caused to: receive from the cell, a configuration for reporting the event corresponding to the event identifier.

6. The apparatus of claim 5, wherein the apparatus comprises, or is comprised in, a terminal device of the radio access network.

7. The apparatus of claim 6, wherein the terminal device is a reduced capability device.

8. A system comprising:

an apparatus in a radio access network;

at least one processor; and at least one memory including one or more computer program codes, wherein the one or more computer program codes are configured that, when are executed with the at least one processor, to cause the apparatus to:

obtain information comprising an event identifier, wherein the event identifier is to be used in reporting an event to the radio access network when the event occurs, wherein the event indicates an increase above a respective threshold in the following: temperature, humidity, pressure, and noise of the apparatus;

receive system information comprising a randomization parameter that is based on a load condition of the radio access network, the randomization parameter comprises a threshold value indicating a maximum time value for delaying a random-access procedure;

detect, by an application layer of the apparatus, the event associated with the event identifier;

send the event identifier to an access stratum layer of the apparatus;

based on sending the event identifier, causing the access stratum layer to initiate a randomized initial transmission based on the randomization parameter;

select a delay value in response to an occurrence of the event, wherein the delay value is less than the threshold value;

delay by the selected delay value in time, one or more subsequent random access attempts associated with the random-access procedure to a cell of the radio access network;

suspend the random-access procedure during the delay;

receive, from the cell, a command comprising at least the event identifier and an indication to continue the one or more subsequent random access attempts, wherein the command is received based on a pre-defined number of reports associated with the event identifier required by an application server are not yet received; and stop the one or more subsequent random access attempts associated with the event identifier based on a pre-defined pattern, wherein the pre-defined pattern indicates a set of time occasions in connection with: when to trigger or resume the random-access procedure associated with the event identifier; and when to suspend or postpone the random-access procedure associated with the event identifier.

9. The system of claim 8, wherein the selected delay value is a random value.

10. The system of claim 9, wherein the apparatus is further caused to:

monitor one or more paging occasions on a search space with a time interval, wherein the command is received in a paging message, while monitoring the one or more paging occasions.

11. The system of claim 10, wherein the apparatus is further caused to:

indicate, from the access stratum layer of the apparatus, to a non-access stratum layer of the apparatus, a success of the random-access procedure upon stopping the one or more subsequent random access attempts.

12. The system of claim 11, wherein the apparatus is further caused to:

receive from the cell, a configuration for reporting the event corresponding to the event identifier.

13. The system of claim 12, wherein the apparatus comprises, or is comprised in, a terminal device of the radio access network.

14. The system of claim 13, wherein the terminal device is a reduced capability device.

15. A method performed by an apparatus, comprising:

obtaining information comprising an event identifier, wherein the event identifier is to be used in reporting an event to the radio access network when the event occurs, wherein the event indicates an increase above a respective threshold in the following: temperature, humidity, pressure, and noise of the apparatus;

receiving system information comprising a randomization parameter that is based on a load condition of the radio access network, the randomization parameter comprises a threshold value indicating a maximum time value for delaying a random-access procedure;

detecting, by an application layer of the apparatus, the event associated with the event identifier;

sending the event identifier to an access stratum layer of the apparatus;

based on sending the event identifier, causing the access stratum layer to initiate a randomized initial transmission based on the randomization parameter;

selecting a delay value in response to an occurrence of the event, wherein the delay value is less than the threshold value;

delaying by the selected delay value in time, one or more subsequent random access attempts associated with the random-access procedure to a cell of the radio access network;

suspending the random-access procedure during the delay;

receiving, from the cell, a command comprising at least the event identifier and an indication to continue the one or more subsequent random access attempts, wherein the command is received based on a predefined number of reports associated with the event identifier required by an application server are not yet received; and stopping the one or more subsequent random access attempts associated with the event identifier based on a pre-defined pattern, wherein the pre-defined pattern indicates a set of time occasions in connection with: when to trigger or resume the random-access procedure associated with the event identifier; and when to suspend or postpone the random-access procedure associated with the event identifier.

16. The method of claim 15, wherein the selected delay value is a random value.

17. The method of claim 16, further comprising:

monitoring one or more paging occasions on a search space with a time interval, wherein the command is received in a paging message, while monitoring the one or more paging occasions.

18. The method of claim 17, further comprising:

indicating, from the access stratum layer of the apparatus, to a non-access stratum layer of the apparatus, a success of the random-access procedure upon stopping the one or more subsequent random access attempts.

19. The method of claim 18, further comprising:

receiving from the cell, a configuration for reporting the event corresponding to the event identifier.

20. The method of claim 19, wherein the apparatus comprises, or is comprised in, a terminal device of the radio access network, and wherein the terminal device is a reduced capability device.

* * * * *